United States Patent
Chun et al.

(10) Patent No.: US 8,488,523 B2
(45) Date of Patent: Jul. 16, 2013

(54) METHOD OF TRANSMITTING AND PROCESSING DATA BLOCK OF SPECIFIC PROTOCOL LAYER IN WIRELESS COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 179 days.

(21) Appl. No.: 12/452,733

(22) PCT Filed: Aug. 14, 2008

(86) PCT No.: PCT/KR2008/004752
§ 371 (c)(1),
(2), (4) Date: Jan. 20, 2010

(87) PCT Pub. No.: WO2009/022877
PCT Pub. Date: Feb. 19, 2009

(65) Prior Publication Data
US 2010/0128669 A1 May 27, 2010

Related U.S. Application Data

(60) Provisional application No. 60/955,651, filed on Aug. 14, 2007, provisional application No. 60/983,304, filed on Oct. 29, 2007, provisional application No. 60/983,563, filed on Oct. 29, 2007, provisional application No. 61/019,575, filed on Jan. 7, 2008, provisional application No. 61/037,309, filed on Mar. 17, 2008, provisional application No. 61/038,395, filed on Mar. 20, 2008, provisional application No. 61/039,095, filed on Mar. 24, 2008, provisional application No. 61/047,736, filed on Apr. 24, 2008.

(30) Foreign Application Priority Data
Aug. 14, 2008 (KR) ........................ 10-2008-0079899

(51) Int. Cl.
*H04W 4/00* (2009.01)
*H04W 80/04* (2009.01)
*H04W 88/06* (2009.01)

(52) U.S. Cl.
CPC .............. *H04W 80/04* (2013.01); *H04W 88/06* (2013.01)
USPC .......................... 370/328; 370/338; 370/346

(58) Field of Classification Search
USPC ........... 370/346, 349, 329, 338, 328; 455/39, 455/502
See application file for complete search history.

(56) References Cited

U.S. PATENT DOCUMENTS

| 5,878,041 A | 3/1999 | Yamanaka et al. |
| 6,445,917 B1 | 9/2002 | Bark et al. |

(Continued)

FOREIGN PATENT DOCUMENTS

| CN | 1314747 A | 9/2001 |
| CN | 1339903 | 3/2002 |

(Continued)

OTHER PUBLICATIONS

Wang et al., U.S. Appl. No. 60/976,139.

(Continued)

*Primary Examiner* — Pao Sinkantarakorn
*Assistant Examiner* — Richard K Chang
(74) *Attorney, Agent, or Firm* — McKenna Long & Aldridge LLP

(57) ABSTRACT

A method of transmitting a data block at a transmitting side in a wireless communication system is disclosed. The present invention generates a data block including polling information but no upper layer data, the polling information requesting a transmission of acknowledgement information (status report) on at least one data block transmitted to a receiving side and then transmits the data block to the receiving side, thereby it is possible to raise efficiency in wireless transmission.

2 Claims, 11 Drawing Sheets

U.S. PATENT DOCUMENTS

| | | |
|---|---|---|
| 6,594,240 B1 | 7/2003 | Chuah et al. |
| 6,594,244 B1 * | 7/2003 | Chang et al. .................. 370/335 |
| 6,628,946 B1 | 9/2003 | Wiberg et al. |
| 6,728,918 B1 | 4/2004 | Ikeda |
| 6,738,624 B1 | 5/2004 | Aksentijevic et al. |
| 6,862,450 B2 | 3/2005 | Mikola et al. |
| 6,874,113 B2 | 3/2005 | Chao et al. |
| 6,967,936 B1 | 11/2005 | Laroia et al. |
| 7,171,163 B2 | 1/2007 | Terry et al. |
| 7,180,885 B2 | 2/2007 | Terry |
| 7,227,857 B2 | 6/2007 | Kuo |
| 7,227,868 B2 | 6/2007 | Inden |
| 7,295,573 B2 | 11/2007 | Yi et al. |
| 7,313,116 B2 | 12/2007 | Lee et al. |
| 7,400,593 B2 | 7/2008 | Choi et al. |
| 7,450,933 B2 | 11/2008 | Kwak et al. |
| 7,486,699 B2 | 2/2009 | Yi et al. |
| 7,525,908 B2 | 4/2009 | Olsson et al. |
| 7,706,410 B2 | 4/2010 | Chun et al. |
| 7,710,930 B2 | 5/2010 | Kwak |
| 7,817,595 B2 | 10/2010 | Wu |
| 7,876,771 B2 | 1/2011 | Bergstrom et al. |
| 7,894,444 B2 | 2/2011 | Lohr et al. |
| 7,978,616 B2 | 7/2011 | Chun et al. |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 8,130,687 B2 | 3/2012 | Cai et al. |
| 8,160,012 B2 | 4/2012 | Chun et al. |
| 8,190,144 B2 | 5/2012 | Chun et al. |
| 8,203,988 B2 | 6/2012 | Chun et al. |
| 8,243,931 B2 | 8/2012 | Yi et al. |
| 2002/0001314 A1 | 1/2002 | Yi et al. |
| 2002/0009999 A1 | 1/2002 | Lee et al. |
| 2002/0024972 A1 | 2/2002 | Yi et al. |
| 2002/0114280 A1 | 8/2002 | Yi et al. |
| 2002/0122411 A1 | 9/2002 | Zimmerman et al. |
| 2003/0007490 A1 | 1/2003 | Yi et al. |
| 2003/0099305 A1 | 5/2003 | Yi et al. |
| 2003/0194992 A1 | 10/2003 | Kim et al. |
| 2004/0008659 A1 * | 1/2004 | Kim .............................. 370/342 |
| 2004/0022213 A1 | 2/2004 | Choi et al. |
| 2004/0076182 A1 | 4/2004 | Wu |
| 2004/0103435 A1 | 5/2004 | Yi et al. |
| 2004/0117860 A1 | 6/2004 | Yi et al. |
| 2004/0146019 A1 | 7/2004 | Kim et al. |
| 2004/0147236 A1 | 7/2004 | Parkvall et al. |
| 2004/0148396 A1 | 7/2004 | Meyer et al. |
| 2004/0153852 A1 | 8/2004 | Wu |
| 2004/0156330 A1 | 8/2004 | Yi et al. |
| 2004/0184438 A1 | 9/2004 | Terry |
| 2004/0208160 A1 | 10/2004 | Petrovic et al. |
| 2004/0229626 A1 | 11/2004 | Yi et al. |
| 2005/0020260 A1 | 1/2005 | Jeong et al. |
| 2005/0026597 A1 | 2/2005 | Kim et al. |
| 2005/0039101 A1 | 2/2005 | Torsner |
| 2005/0041663 A1 * | 2/2005 | Jiang .............................. 370/389 |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0054365 A1 | 3/2005 | Ahn et al. |
| 2005/0063347 A1 | 3/2005 | Sarkkinen |
| 2005/0083943 A1 | 4/2005 | Lee et al. |
| 2005/0094596 A1 | 5/2005 | Pietraski et al. |
| 2005/0096017 A1 | 5/2005 | Kim |
| 2005/0100048 A1 | 5/2005 | Chun et al. |
| 2005/0105499 A1 * | 5/2005 | Shinozaki et al. ............ 370/338 |
| 2005/0118992 A1 | 6/2005 | Jeong et al. |
| 2005/0147040 A1 | 7/2005 | Vayanos et al. |
| 2005/0164683 A1 | 7/2005 | Roberts et al. |
| 2005/0169293 A1 | 8/2005 | Zhang et al. |
| 2005/0192021 A1 | 9/2005 | Lee et al. |
| 2005/0193309 A1 | 9/2005 | Grilli et al. |
| 2005/0201354 A1 * | 9/2005 | Hosaka et al. ................. 370/349 |
| 2005/0213605 A1 | 9/2005 | Kim et al. |
| 2005/0237932 A1 | 10/2005 | Liu |
| 2005/0237960 A1 | 10/2005 | Kim |
| 2005/0238051 A1 | 10/2005 | Yi et al. |
| 2005/0249141 A1 | 11/2005 | Lee et al. |
| 2005/0250526 A1 | 11/2005 | Lindoff et al. |
| 2005/0254467 A1 | 11/2005 | Li et al. |
| 2005/0259662 A1 | 11/2005 | Kim et al. |
| 2005/0286483 A1 | 12/2005 | Lee et al. |
| 2005/0287957 A1 | 12/2005 | Lee et al. |
| 2006/0007886 A1 | 1/2006 | Lee et al. |
| 2006/0030342 A1 | 2/2006 | Hwang et al. |
| 2006/0056441 A1 * | 3/2006 | Jiang ............................. 370/449 |
| 2006/0067238 A1 | 3/2006 | Olsson et al. |
| 2006/0067289 A1 | 3/2006 | Lee et al. |
| 2006/0067364 A1 | 3/2006 | Jung et al. |
| 2006/0072494 A1 | 4/2006 | Matusz |
| 2006/0072503 A1 | 4/2006 | Kim et al. |
| 2006/0084389 A1 | 4/2006 | Beale et al. |
| 2006/0092972 A1 | 5/2006 | Petrovic et al. |
| 2006/0098574 A1 | 5/2006 | Yi et al. |
| 2006/0128312 A1 | 6/2006 | Declerck et al. |
| 2006/0142020 A1 | 6/2006 | Mueckenheim et al. |
| 2006/0154603 A1 * | 7/2006 | Sachs et al. ..................... 455/39 |
| 2006/0154680 A1 | 7/2006 | Kroth et al. |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield et al. |
| 2006/0251105 A1 | 11/2006 | Kim et al. |
| 2006/0264179 A1 | 11/2006 | Bonneville et al. |
| 2006/0268798 A1 | 11/2006 | Kim et al. |
| 2006/0274690 A1 | 12/2006 | Chun et al. |
| 2006/0280145 A1 | 12/2006 | Revel et al. |
| 2006/0281456 A1 | 12/2006 | Roberts et al. |
| 2007/0041397 A1 | 2/2007 | Hwang |
| 2007/0047493 A1 | 3/2007 | Park et al. |
| 2007/0053309 A1 | 3/2007 | Poojary et al. |
| 2007/0060139 A1 | 3/2007 | Kim et al. |
| 2007/0079207 A1 | 4/2007 | Seidel et al. |
| 2007/0081468 A1 | 4/2007 | Timus |
| 2007/0081513 A1 | 4/2007 | Torsner |
| 2007/0091810 A1 | 4/2007 | Kim et al. |
| 2007/0097913 A1 | 5/2007 | Hanov |
| 2007/0117579 A1 | 5/2007 | Cai et al. |
| 2007/0178878 A1 | 8/2007 | Ding |
| 2007/0183358 A1 | 8/2007 | Cai |
| 2007/0189205 A1 | 8/2007 | Terry et al. |
| 2007/0201397 A1 | 8/2007 | Zhang |
| 2007/0206530 A1 | 9/2007 | Lee et al. |
| 2007/0223526 A1 | 9/2007 | Jiang |
| 2007/0258591 A1 | 11/2007 | Terry et al. |
| 2007/0268861 A1 | 11/2007 | Diachina et al. |
| 2007/0274278 A1 | 11/2007 | Choi et al. |
| 2007/0297360 A1 | 12/2007 | Joachim et al. |
| 2007/0297367 A1 | 12/2007 | Wang et al. |
| 2008/0008152 A1 | 1/2008 | Lohr et al. |
| 2008/0043658 A1 | 2/2008 | Worrall |
| 2008/0045224 A1 | 2/2008 | Lu et al. |
| 2008/0049682 A1 | 2/2008 | Ding et al. |
| 2008/0051098 A1 | 2/2008 | Rao |
| 2008/0059859 A1 | 3/2008 | Marinier et al. |
| 2008/0069108 A1 | 3/2008 | Yi et al. |
| 2008/0084851 A1 | 4/2008 | Kim et al. |
| 2008/0089285 A1 | 4/2008 | Pirskanen et al. |
| 2008/0101609 A1 | 5/2008 | Jiang |
| 2008/0146242 A1 | 6/2008 | Alanara et al. |
| 2008/0165717 A1 | 7/2008 | Chen et al. |
| 2008/0165755 A1 | 7/2008 | Marinier et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0186946 A1 | 8/2008 | Marinier et al. |
| 2008/0198869 A1 | 8/2008 | Jiang |
| 2008/0212561 A1 | 9/2008 | Pani et al. |
| 2008/0232396 A1 | 9/2008 | Buckley et al. |
| 2008/0233940 A1 | 9/2008 | Jen |
| 2008/0233941 A1 | 9/2008 | Jen |
| 2008/0261581 A1 | 10/2008 | Cai |
| 2008/0268878 A1 | 10/2008 | Wang et al. |
| 2008/0273482 A1 | 11/2008 | Lee et al. |
| 2008/0273610 A1 | 11/2008 | Malladi et al. |

| Publication No. | Date | Name |
|---|---|---|
| 2008/0310395 A1 | 12/2008 | Kashima |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0041240 A1 | 2/2009 | Parkvall et al. |
| 2009/0046631 A1 | 2/2009 | Meylan et al. |
| 2009/0046667 A1 | 2/2009 | Pelletier et al. |
| 2009/0046695 A1 | 2/2009 | Jiang |
| 2009/0104890 A1 | 4/2009 | Wang et al. |
| 2009/0116434 A1 | 5/2009 | Lohr et al. |
| 2009/0156194 A1 | 6/2009 | Meylan |
| 2009/0175163 A1 | 7/2009 | Sammour et al. |
| 2009/0175253 A1 | 7/2009 | Wu et al. |
| 2009/0232076 A1 | 9/2009 | Kuo |
| 2009/0259908 A1 | 10/2009 | Gollapudi |
| 2009/0305712 A1 | 12/2009 | Franceschini et al. |
| 2010/0014466 A1 | 1/2010 | Meyer et al. |
| 2010/0091750 A1 | 4/2010 | Lee et al. |
| 2010/0128648 A1 | 5/2010 | Lee et al. |
| 2010/0142429 A1 | 6/2010 | Yi et al. |
| 2010/0142457 A1 | 6/2010 | Chun et al. |
| 2010/0157904 A1 | 6/2010 | Ho et al. |
| 2010/0172282 A1 | 7/2010 | Zhang et al. |
| 2010/0232335 A1 | 9/2010 | Lee et al. |
| 2010/0260140 A1 | 10/2010 | Zhu |
| 2011/0019604 A1 | 1/2011 | Chun et al. |
| 2011/0033048 A1 | 2/2011 | Stanwood et al. |

FOREIGN PATENT DOCUMENTS

| | | |
|---|---|---|
| CN | 1390425 | 1/2003 |
| CN | 1396780 | 2/2003 |
| CN | 1549610 A | 11/2004 |
| CN | 1613210 | 5/2005 |
| CN | 1642067 A | 7/2005 |
| CN | 1761260 A | 4/2006 |
| CN | 1761356 A | 4/2006 |
| CN | 1792048 A | 6/2006 |
| CN | 1846365 A | 10/2006 |
| CN | 1868157 A | 11/2006 |
| CN | 1918825 A | 2/2007 |
| CN | 1938969 A | 3/2007 |
| CN | 1954521 | 4/2007 |
| CN | 1997227 | 7/2007 |
| CN | 101047966 A | 10/2007 |
| CN | 101090281 A | 12/2007 |
| EP | 1263160 | 12/2002 |
| EP | 1326397 | 7/2003 |
| EP | 1343267 A2 | 9/2003 |
| EP | 1 509 011 A2 | 2/2005 |
| EP | 1508992 A2 | 2/2005 |
| EP | 1638237 | 3/2006 |
| EP | 1 695 462 A1 | 8/2006 |
| EP | 1689130 A1 | 8/2006 |
| EP | 1746855 A2 | 1/2007 |
| EP | 1768297 A2 | 3/2007 |
| EP | 1796405 A1 | 6/2007 |
| EP | 2026523 | 2/2009 |
| EP | 2108223 | 10/2009 |
| JP | 07-162948 | 6/1995 |
| JP | 2000-324161 | 11/2000 |
| JP | 2001-197021 | 7/2001 |
| JP | 2002-198895 A | 7/2002 |
| JP | 2003-018050 | 1/2003 |
| JP | 2003-115796 | 4/2003 |
| JP | 2003-115876 | 4/2003 |
| JP | 2003-516021 | 5/2003 |
| JP | 2003-229925 | 8/2003 |
| JP | 2003-283592 | 10/2003 |
| JP | 2005-073276 | 3/2005 |
| JP | 2006-054718 | 2/2006 |
| JP | 2006-505209 | 2/2006 |
| JP | 2006-514466 | 4/2006 |
| JP | 2006-121562 | 5/2006 |
| JP | 2006-311543 | 11/2006 |
| JP | 2007-116639 | 5/2007 |
| JP | 2007-312244 A | 11/2007 |
| JP | 2008-520125 | 6/2008 |
| JP | 2009-513058 | 3/2009 |
| JP | 2009-521893 | 6/2009 |
| KR | 2001-0045783 A | 6/2001 |
| KR | 10-2001-0062306 A | 7/2001 |
| KR | 2002-0004645 A | 1/2002 |
| KR | 10-2002-0097304 A | 12/2002 |
| KR | 10-2003-0012048 A | 2/2003 |
| KR | 10-2003-0060055 A | 7/2003 |
| KR | 10-2003-0068743 A | 8/2003 |
| KR | 10-2003-0087914 A | 11/2003 |
| KR | 10-2004-0034398 A | 4/2004 |
| KR | 10-2004-0039944 A | 5/2004 |
| KR | 2004-0072961 | 8/2004 |
| KR | 2006-0014910 | 2/2005 |
| KR | 10-2005-00229088 A | 3/2005 |
| KR | 10-2005-0062359 A | 6/2005 |
| KR | 2005-0081836 | 8/2005 |
| KR | 10-2005-0092874 A | 9/2005 |
| KR | 10-2005-0100882 A1 | 10/2005 |
| KR | 10-2005-0103127 A | 10/2005 |
| KR | 2005-0099472 | 10/2005 |
| KR | 10-2006-0004935 A | 1/2006 |
| KR | 10-2006-0029452 A | 4/2006 |
| KR | 10-2006-0042858 A | 5/2006 |
| KR | 2006-0069378 | 6/2006 |
| KR | 2006-0079784 A | 7/2006 |
| KR | 10-2006-0090191 A | 8/2006 |
| KR | 10-2006-0134058 A | 12/2006 |
| KR | 10-2007-0048552 A | 5/2007 |
| KR | 10-2007-0076374 A | 7/2007 |
| KR | 10-0907978 | 7/2009 |
| KR | 10-2009-0084756 | 8/2009 |
| RU | 2291594 C2 | 1/2007 |
| RU | 2304348 | 8/2007 |
| TW | 496058 | 7/2002 |
| WO | WO 01/37473 | 5/2001 |
| WO | WO 01/39386 A1 | 5/2001 |
| WO | WO 03045103 A1 | 5/2003 |
| WO | WO 2004/042953 A1 | 5/2004 |
| WO | WO 2004/042963 | 5/2004 |
| WO | WO2004/102838 | 11/2004 |
| WO | WO 2005-039108 A2 | 4/2005 |
| WO | WO 2005/078967 A1 | 8/2005 |
| WO | WO 2005/079105 | 8/2005 |
| WO | WO2005/109671 | 11/2005 |
| WO | WO 2005/122441 A1 | 12/2005 |
| WO | WO 2005-125226 A2 | 12/2005 |
| WO | WO 2006/009714 | 1/2006 |
| WO | WO 2006/016785 | 2/2006 |
| WO | WO 2006/033521 | 3/2006 |
| WO | WO 2006-046894 A1 | 5/2006 |
| WO | WO 2006-052086 A | 5/2006 |
| WO | WO 2006/083149 | 8/2006 |
| WO | WO 2006/095385 | 9/2006 |
| WO | WO 2006/104335 | 10/2006 |
| WO | WO 2006/104342 | 10/2006 |
| WO | WO 2006/116620 | 11/2006 |
| WO | WO 2006/118418 A2 | 11/2006 |
| WO | WO 2006/118435 | 11/2006 |
| WO | WO 2007/020070 | 2/2007 |
| WO | WO 2007/023364 | 3/2007 |
| WO | WO 2007-024065 A1 | 3/2007 |
| WO | WO 2007/039023 A1 | 4/2007 |
| WO | WO 2007/045505 | 4/2007 |
| WO | WO 2007-052900 A1 | 5/2007 |
| WO | WO 2007/052921 | 5/2007 |
| WO | WO 2007-066900 A1 | 6/2007 |
| WO | WO 2007-078142 A1 | 7/2007 |
| WO | WO 2007-078155 A2 | 7/2007 |
| WO | WO 2007/078156 | 7/2007 |
| WO | WO 2007-078164 A1 | 7/2007 |
| WO | WO 2007-078173 A1 | 7/2007 |
| WO | WO 2007/079085 | 7/2007 |
| WO | WO 2007-089797 A2 | 8/2007 |
| WO | WO 2007/091831 A2 | 8/2007 |
| WO | WO 2007-126793 A2 | 11/2007 |
| WO | WO 2007-078174 A1 | 12/2007 |
| WO | WO 2007-147431 A | 12/2007 |
| WO | WO 2008/004725 A1 | 1/2008 |

| | | |
|---|---|---|
| WO | WO 2008/010063 | 1/2008 |
| WO | WO 2008/094120 | 8/2008 |
| WO | WO 2009/035301 | 3/2009 |

OTHER PUBLICATIONS

Sammour et al. U.S. Appl. No. 61/019,058.

Reuven Cohen: "An Improved SSCOP-like Scheme for Avoiding Unnecessary Retransmissions and Achieving Ideal Throughput", Conference on Computer Communications, Fifteenth Annual Joint conference of the IEEE computer and communications societies, Mar. 24-28, 1996, vol. 2, pp. 855-862, XP010158150.

Ghosh et al., "Random Access Design for UMTS Air-Interface Evolution", Vehicular Technology Conference, Apr. 2007, pp. 1041-1045.

Abeta et al., "Super 3G Technology Trends. Part 2: Research on Super 3G Technology", NTT Docomo Technical Journal, vol. 8, No. 3, Dec. 2006, pp. 55-62.

Nokia, "System Information Distrubution", 3GPP TSG-RAN WG2 Ad Hoc Meeting on LTE, R2-061487, Jun. 2006.

LG Electronics, "Delivery of LTE System Information", 3GPP TSG-RAN WG2 Ad Hoc Meeting on LTE, R2-061959, Jun. 2006.

NEC, "Optimised buffer status reporting", 3GPP TSG-RAN WG2 #58bis, R2-072515, Jun. 2007.

Catt, Ritt, "Consideration on UL Buffer Reporting", 3GPP TSG-RAN WG2 #55, R2-062935, Oct. 2006.

Nokia: "Buffer reporting for E-UTRAN", vol. R2-060829, pp. 1-5, XP002503218.

"Uplink Scheduling for VoIP", No. R2-070476, Feb. 12, 2007, pp. 1-15, XP008125208.

R2-074691; Ericsson, Nokia Corporation, Nokia Siemens Networks, Qualcomm Europe, Samsung, NTT DoCoMo, Inc. "Framework for Scheduling Request and Buffer Status reporting", Nov. 5-9, 2007, TSG-RAN WG2 Meeting #60.

R1-063046; Motolola, "Syncronized Random Access Channel and Scheduling Request", Nov. 6-10, 2006, 3GPP TSG RAN1 #47.

R2-062350; Ericsson, "Basic Principles for the Scheduling Request in LTE", Aug. 28-Sep. 1, 2006, 3GPP TSG RAN WG2 #54.

R1-063301; NTT DoCoMo, Fujitsu, Mitsubishi Electric, NEC, Sharp, Toshiba Corporation, "Scheduling Request Transmission Method for E-UTRA Uplink", Nov. 6-10, 2006, 3GPP TSG RAN WG1 Meeting #47.

ZTE: "Redundant retransmission restraint in RLC-AM" 3GPP Draft, R2-061234, May 3, 2006, XP050131180.

"Digital Cellular telecommunications system (Phase 2+); Functional stage 2 description of Location Services (LSC) in GERAN (3GPP TS 43.059 version 7.3.0 Release 7); ETSI TS 143 059", May 1, 2007, XP014038519.

LG Electronics Inc. "Correction of status report coding", 3GPP TSG RAN WG2 #61, Feb. 11-15, 2008, Sorrento, Italy, XP-002624626.

3rd Generation Partnership Project: "Technical Specification Group Radio Access Network, Evolved Universal terrestrial Radio Access (E-UTRA), Packet Data Convergence Protocol (PDCP) specification (Release 8)", 3GPP TS 36.323 V8.2.1, May 2008.

Alcatel-Lucent: "PDCP status report carrying LIS only", 3GPP TSG RAN WG2 #61, Jan. 14-18, 2008, Sevilla, Spain, XP-50138711.

Qualcomm Europe: "Further Details on RACH Procedure", 3GPP TSG-RAN WG1 #48, Feb. 12-16, 2007, St. Louis, Missouri, R1-070649.

NTT DoCoMo, Inc. "Buffer Status Report and Scheduling Request triggers", 3GPP TSG RAN WG2 #59, Aug. 20-24, 2007, Athens, Greece, R2-072574.

"Correction to PDCP Status Report", 3GPP TSG RAN WG2 #61 bis, Mar. 24, 2008, R2-081594, XP-002624627.

LG Electronics Inc: "UE State Transition in LTE_ACTIVE", 3 GPP TSG-RAN WG2 #52; Athens, Greece; Mar. 2006.

Texas Instruments: "UL Synchronization Management and Maintenance in E-UTRA"; Kobe, Japan; May 2007.

Texas Instruments: "UL Synchronization Management in LTE_Active"; St. Julians, Malta; Mar. 2007.

Motorola: "Contention-Free Intra-LTE Handover"; St. Louis, USA; Feb. 2007.

Ericsson: "Scheduling Request in E-UTRAN"; Sorrento, Italy; Jan. 2007.

QUALCOMM Europe: "Scheduling request mechanism", 3GPP TSG-RAN WG1 #48bis, Mar. 30, 2007, R1-071276.

Texas Instruments: "Scheduling Request and DRX in E-UTRA", 3GPP TSG RAN WG1 #49bis, Jun. 29, 2007, R1-072859.

Nokia Siemens Networks: "Update on Security, System Information, Mobility, MAMS and DRX", 3GPP TSG-RAN2 Meeting #59, Aug. 31, 2007, R2-073863.

Ericsson: "SDU discard", 3GPP, Aug. 24, 2007, R2-073230.

ASUSTek, "Summary of HFN de-synchronization problem off-line email discussion", 3GPP TSG RAN WG2 #46 Tdoc R2-050318, Feb. 2005.

ASUSTek, "On-line recovery of HFN synchronization due to RLC UM SN problem", 3GPP TSG-RAN WG2 Meeting #44 R2-041940, Oct. 2004.

3GPP TS 36.321 E-UTRA MAC protocol specification, 3GPP TS 36.321 v1.0.0, Sep. 2007 RP-070689.

Motorola, "MAC Header format", 3GPP TSF RAN2, Meeting #59bis, Oct. 8-12, 2007, R2-074419.

NTT DoCoMo et al. "MAC PDU structure for LTE", 3GPP TSG Ran WG2 #59 bis, Oct. 8-12, 2007, R2-074174.

3GPP TSG RAN WG2 #59bis LTE User Plane session report, 3GPP R2-074536, Oct. 12, 2007.

3GPP TS 25.321 Medium Access Control protocol specification, 3GPP TS25.321 v7.5.0, Jun. 2007.

3GPP TS 36.322, V8.0.0, Dec. 2007, 3rd Generation Partnership Project; Technical Specification Group Radio Access Network; Evolved Universal Terrestrial Radio Access (E-UTRA) Radio Link Control (RLC) protocol specification (Release 8).

Change Request, Miscellaneous corrections to TS 36.322, 3GPP TSG-RAN2 Meeting #61, Shenzhen, China, Mar. 31-Apr. 4, 2008, R2-081700.

Ericsson: "Clarification to the handling of large RLC status reports", Change Request, 3GPP TSG-RAN2 Meeting #61bis, Shenzhen, China, Mar. 31-Apr. 4, 2008, R2-082018.

LG Electronics et al. "ACK_SN setting for short Status PDU", 3GPP TSG-RAN WG2 #62, May 5-9, 2008, Kansas City, Missouri, R2-082133.

Itri, "Buffer Status Reporting with Group Combining for LTE", 3GPP TSG-RAN WG2, Meeting #58bis, Orlando, Florida, Jun. 25-29, 2007, R2-072833.

Nec, "Considerations on Scheduling Information", 3GPP TSG RAN WG2#59, Athens, Greece, Aug. 20-24, 2007, R2-073556.

Amitava Ghosh et al., "Random Access Design for UMTS Air-Interface Evolution", Networks and Enterprise Business, Motorola, 2007 IEEE, pp. 1041-1045.

LG Electronics Inc., "Correction to polling procedure", 3GPP TSG-RAN WG2 #61 bis, Mar. 31-Apr. 4, 2008, Shenzhen, China, R2-081588.

"Universal Mobile Telecommunications System (UMTS); Radio Link Control (RLC) protocol specification", ETSI TS 322, v4.10.0, Sep. 2003, Release 4.

LG Electronics, "Update of eUtran PDCP specification", 3GPP TSG-RAN2 Meeting #61, Sorrento, Italy, 2008, R2-081390.

Jiang, ASUSTeK Computer Inc., "HFN de-synchronization detection with integrity protection scheme in a wireless communications system", U.S. Appl. No. 60/863,800.

Qualcomm Europe, "UL Requests", 3GPP TSG-RAN WG1 #47bis, Jan. 15-19, 2007, Sorrento, Italy, R1-070426.

Alcatel-Lucent, Format for RACH Message 2, R2-080176, 3GPP Jan. 1, 2008.

Motorola, Design of backoff scheme for LTE, R2-070143, 3GPP, Jan. 19, 2007.

MAC Rapporteurs (Ericsson, Qualcomm Europe), E-UTRA MAC protocol specification update, R2-080631, 3GPP, Jan. 18, 2008.

NTT DoCoMo Inc., "Uplink synchronization maintenance", 3GPP TSG RAN WG2 #58, May 7-11, 2007, Kobe, Japan, R2-072014.

3GPP TSG-RAN WG2 Meeting #60 R2-074701, RLC status report format, Ericsson, Nov. 9, 2007.

LG Electronics Inc., "Discussion on BCCH update", 3GPP TSG-RAN WG2 #58bis, Jun. 25-29, 2007, Orlando, FL, R2-072736.

Catt, "Notification scheme for system information change", 3GPP TSG-RAN WG2 #58, May 7-11, 2007, Kobe, Japan, R2-071870.

3GPP TS 36.321 V8.2.0 (May 2008), 3rd Generation Partnership Project; Technical Specification Group Radio Access Network; Evolved Universal Terrestrial Radio Access (E-UTRA) Medium Access Control (MAC) protocol specification (Release 8), Jun. 17, 2008.

3GPP TSG-RAN WG2 Meeting #67, Shenzen, China, Aug. 24-28, 2009, R2-095152.

Qualcomm Europe, General Corrections to RLC, R2-011701, 3GPP, Jul. 13, 2001.

LG Electronics Inc, Out-of-sequence problem in AM RLC: Discretely discarded SDUs, R2-011206, 3GPP, May 25, 2001.

* cited by examiner

METHOD OF TRANSMITTING AND PROCESSING DATA BLOCK OF SPECIFIC PROTOCOL LAYER IN WIRELESS COMMUNICATION SYSTEM

This application is a National Stage Entry of International Application No. PCT/KR2008/004752, filed on Aug. 14, 2008, and claims priority to Korean Patent Application No. 10-2008-0079899, filed Aug. 14, 2008; and U.S. Provisional Application Nos. 60/955,651, filed Aug. 14, 2007; 60/983,304, filed Oct. 29, 2007; 60/983,563, filed Oct. 29, 2007; 61/019,575, filed Jan. 7, 2008; 61/037,309, filed Mar. 17, 2008; 61/038,395, filed Mar. 20, 2008; 61/039,095, filed Mar. 24, 2008; and 61/047,736, filed Apr. 24, 2008, each of which is hereby incorporated by reference in its entirety as if fully set forth herein.

TECHNICAL FIELD

The present invention relates to a data block transmitting and processing method in a wireless communication system, and more particularly, to a method of transmitting a data block at a specific protocol layer and a method of processing a data block at a specific protocol layer. Although the present invention is suitable for a wide scope of applications, it is particularly suitable for good transmission efficiency.

BACKGROUND ART

FIG. 1 is a diagram of a network structure of an E-UMTS (evolved universal mobile telecommunications system) which is one of the fourth generation wireless communication systems. The E-UMTS is the system evolved from a conventional UMTS system. And, the basic standardization is ongoing by 3GPP. Besides, the E-UMTS can be also called LTE (long term evolution).

E-UMTS network can be mainly divided into E-UTRAN (evolved UTRAN) and EPC (evolved packet core). The E-UTRAN consists of a user equipment (hereinafter abbreviated UE), a base station (hereinafter called eNode B) and an access gateway (hereinafter abbreviated AG and expressible as MME (mobility management entity)/UPE (user plane entity)) located at an end point of the network to be externally connected to an external network. The AG can be divided into one part responsible for user traffic processing and the other part for processing control traffic. In this case, the AG for new user traffic processing and the AG for processing control traffic can communicate with each other using a new interface. At least one cell can exist at a single eNode B. Between eNode Bs, an interface for user or control traffic transmission is usable. And, the EPC can consist of a node for user registrations of the AG and other UE and the like.

Interface for discriminating the E-UTRAN or the EPC is available. A plurality of nodes are connectible together via an interface S1 between the eNode B and the AG (many to many). In a meshed structure, the eNode Bs are connected via an interface X2 and the interface X2 always exists between the eNode Bs adjacent to each other.

Radio protocol layers between a user equipment and a network can be divided into L1 (first layer), L2 (second layer) and L3 (third layer) based on three lower layers of the open system interconnection (OSI) reference model widely known in the field of communication systems. A physical layer of the first layer provides an information transfer service using a physical channel, and a radio resource control (hereinafter abbreviated RRC) located on the third layer plays a role in controlling radio resources between the user equipment and the network. For this, the RRC layers exchange RRC messages between the user equipment and the network. In the E-UTRAN, the RRC layer is located at the eNode B.

FIG. 2 is a diagram of a radio protocol layer structure between a user equipment and E-UTRAN (UMTS terrestrial radio access network) based on the radio access network specification of the 3GPP that is the third generation radio communication standardization organization. Referring to FIG. 2, a radio protocol layer structure horizontally consists of a physical layer, a data link layer and a network layer. And the radio protocol layer structure vertically consists of a user plane for data information transfer and a control plane for control signal forwarding (signaling). The radio protocol layers shown in FIG. 2 can be divided into L1 (first layer), L2 (second layer) and L3 (third layer) based on three lower layers of the open system interconnection (OSI) reference model widely known in the field of communication systems.

The respective layers of the control and user planes in the radio protocol layer structure shown in FIG. 2 are explained as follows. First of all, a physical layer of the first layer provides an upper layer with an information transfer service using a physical channel. The physical layer is connected to a medium access control layer on an upper layer via a transport channel. And, data is transported between the medium access control layer and the physical layer via the transport channel. Moreover, data are transported via the physical channel between different physical layers, i.e., between a physical layer of a transmitting side and a physical layer of a receiving side.

A medium access control (hereinafter abbreviated 'MAC') of a second layer provides a radio link control layer of an upper layer via a logical channel. The radio link control (hereinafter abbreviated RLC) of the second layer supports a reliable data transfer. A function of the RLC layer can be implemented as a function block within the MAC. If so, the RLC layer may not exist. PDCP layer of the second layer performs a header compression function for reducing a size of an IP packet header containing relatively large and unnecessary control information to efficiently transmit such an IP packet as IPv4 and IPv6 in a radio section having a narrow bandwidth. The PDCP layer in E-UTRAN is located at the AG.

A radio resource control (hereinafter abbreviated RRC) layer located at a most upper part of the third layer is defined in the control plane only and is responsible for controlling a logical channel, a transport channel and a physical channel in association with configuration, reconfiguration and release of radio bearers (hereinafter abbreviated RBs). In this case, each of the RBs means a service provided by the second layer for the data transfer between the user equipment and the E-UTRAN.

A unit of data transferred from the respective layers of the radio protocol layer structure is called a name differing in the corresponding layer, which is called a service data unit (hereinafter abbreviated SDU). And, a basic unit used by a protocol to transfer data to another layer is called a protocol data unit (hereinafter abbreviated PDU). In the following description, data transferred within or between the layers in the radio access protocol structure of the present invention means a data block of such a prescribed unit as the SDU and the PDU.

The RLC layer is explained in detail as follows. First of all, basic functions of the RLC layer include the QoS (quality of service), security of each RB and the corresponding data transfer. Since the RB service is the service provided to an upper layer by the second layer of the radio protocol, the whole second layer affects the QoS of the RB. Particularly, the RLC has bigger influence. The RLC provides an independent RLC entity to each RB to secure the intrinsic QoS of the corresponding RB and provides three kinds of RLC modes including a transparent mode (hereinafter abbreviated TM), an unacknowledged mode hereinafter abbreviated UM) and an acknowledged mode (hereinafter abbreviated AM) to support various kinds of QoS. Since each of the three kinds of RLC modes differs in supported QoS, there exists a difference in an operational method. And, its detailed functions differ as well. In the following description, the respective operational modes of the RLC are explained.

TM RLC is the mode that no overhead is attached to SDU of a RLC layer (hereinafter named RLC SDU) delivered from an upper layer in generating a PDU at a RLC layer (hereinafter named RLC PDU). In particular, since RLC enables SDU to be transparently transmitted, it is called TM RLC. Due to the above characteristics, the TM RLC plays the following function in the user plane or the control plane. Since a data processing time is short within a RLC of the user plane and an overhead does not exist within a RLC of the control plane, the TM RLC is responsible for the transfer of a RRC message from an unspecific user equipment in uplink or is responsible for a transfer of a RRC message broadcasted to all user equipments within a cell in downlink.

Unlike the transparent mode, a mode for adding an overhead in RLC is called a non-transparent mode. And, the non-transparent mode can be classified into an unacknowledged mode (UM) of providing non-acknowledgement for transmitted data and an acknowledged mode of providing acknowledgement. UM RLC transmits each PDU by attaching a head including a sequence number to the corresponding PDU, thereby enabling a receiving side to know which PDU is lost in the course of transmission.

Owing to the above function, the UM RLC is responsible for transmission of broadcast/multicast data or real-time transmission of packet data such as voice (e.g., VoIP) or streaming of a packet service domain (hereinafter abbreviated PS domain) in a user plane. And, the UM RLC is responsible for transmission of a RRC message, which does not need acknowledgement among RRC messages to be transmitted to a specific user equipment or a specific user equipment group within a cell in a control plane.

In case that the UM RLC is used for a voice service, a size of data of the voice service amounts to 100-200 bits. An overhead occupies about 20 bits in a header, and as mentioned in the foregoing description, includes a sequence number field and various control fields (e.g., frame information field, extension field, etc.) which will be explained later.

AM RLC, which is one of the non-transparent mode, constructs a PDU by attaching a PDU header including a sequence number in the same manner as the UM RLC. Unlike the UM RLC, the AM RLC has a big difference in that a receiving side makes acknowledgement for a PDU transmitted by a transmitting side. In the AM RLC, the reason why the receiving side makes the acknowledgement is because the receiving side makes a request for the transmitting side to retransmit the PDU which is failed to be received by the receiving side. Thus, the retransmission function is the major characteristic of the AM RLC. Therefore, the object of the AM RLC is to secure error-free data transmission through the retransmission. Due to such an object, the AM RLC is responsible for non-real-time transmission of packet data such as TCP/IP of a packet service (PS) domain in a user plane. And, the AM RLC is responsible for transmission of a RRC message, for which acknowledgement is mandatory, among RRC messages transmitted to a specific user equipment within a cell in a control plane.

In aspect of directionality, both of the TM RLC and the UM RLC are used for uni-directional communication, whereas the AM RLC is used for bi-directional communication due to the feedback from a receiving side. Since the bi-directional communication is mainly used for point-to-point communication, the AM RLC uses a dedicated logical channel only. There is a difference in aspect of structure. The TM or UM RLC is configured in a manner that a single RLC entity includes a single structure for either transmission or reception, whereas the AM RLC is configured in a manner that both transmission and reception structures exist within a single RLC entity.

The AM RLC includes a retransmission buffer for retransmission management as well as a transceiving buffer. And, the AM RLC performs various schemes including a use of a transceiving window for a flow control, a use of polling for a transmitting side to make a request for status information to a receiving side of a peer RLC entity, a use of status information report (status report) for a receiving side to make a report of its buffer status to a transmitting side of a RLC entity, a use of status information PDU (status PDU) for carrying status information, a use of piggyback for inserting a status information PDU in a data area of a PDU to raise efficiency of data transmission and the like. To support these functions, the AM RLC needs various protocol parameters, state variables and a timer. Thus, the PDUs used for data transmission control in a RLC layer, such as status information report, are called control PDUs. And, PDUs for carrying user data corresponding to a payload on a data area part are called data PDUs.

The AM RLC layer performs relevant operations to enable the entire data, which are transmitted to a receiving side by a transmitting side, to be successfully received by the receiving side. For instance, a transmitting side is able to receive transceiving confirmation information (e.g., RLC status report) from the relieving side, which is a status information report for data transmitted to a receiving side. And, the transmitting side is able to perform a retransmission for the data identified as not received by the receiving side via the transceiving confirmation information.

Yet, the transceiving confirmation information transmitted by the receiving side may be lost on a radio channel in the course of being transmitted to the transmitting side. If this situation is possible, the transmitting side can aggressively make a request for the receiving side to transmit the transceiving confirmation information. The procedure associated with the request by the transmitting side and a response to the request made by the receiving side is called a polling procedure.

In the course of the polling procedure, the transmitting side provides a field for indicating a presence or non-presence of a request for a transmission of transceiving confirmation information in a header of RLC PDU, which is transmitted to the receiving side by the transmitting side itself, thereby the transmitting can make a polling request to the receiving side.

DISCLOSURE OF THE INVENTION

Technical Problem

However, as mentioned in the foregoing description, a data block in a specific protocol layer includes an upper layer data block corresponding to a payload and a header corresponding to a set of control informations on the upper layer data block. If a size of the header increases, efficiency of radio resources decreases.

Moreover, in case that a transmitting side transmits a data block including a polling request field at a specific protocol layer in a polling procedure, transmission of the data block including a payload part therein results in a waste of radio resources.

Technical Solution

Accordingly, the present invention is directed to data block transmitting and processing methods in a wireless communication system that substantially obviate one or more of the problems due to limitations and disadvantages of the related art.

An object of the present invention is to provide a method of transmitting a data block having high transmission efficiency at a specific protocol layer in a wireless communication system.

Another object of the present invention is to provide a method of generating and transmitting a data block having high transmission efficiency at a specific protocol layer that supports a retransmission in a wireless communication system.

Another object of the present invention is to provide a method of processing a data block having high transmission efficiency at a specific protocol layer in a wireless communication system, by which the data block can be suitably transferred to a lower layer by a specific protocol layer entity of the wireless communication system.

Another object of the present invention is to provide a method of transmitting and processing a data block having high transmission efficiency at a specific protocol layer that supports a retransmission in a wireless communication system.

Another object of the present invention is to provide a method of transferring data suitably to a lower layer by a specific protocol layer entity in a wireless communication system.

A further object of the present invention is to provide a method of processing data by a prescribed priority at a specific protocol layer entity in a wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting a data block by a transmitting side in a wireless communication system, includes the steps of generating the data block including polling information for requesting a transmission of acknowledgement information (status report) on at least one data block transmitted to a receiving side and transmitting the data block to the receiving side, wherein the data block does not include any data from upper layer.

To further achieve these and other advantages and in accordance with the purpose of the present invention, a method of transmitting a lower layer data block including a header by a transmitting side in a wireless communication system, includes the steps of receiving at least one or more data blocks from an upper layer, generating the lower layer data block including a data area having at least a part of the at least one or more upper layer data blocks and a configuration information indicator indicating at least a part of configuration information of the data area and the header, and transmitting the lower layer data block to a receiving side.

Preferably, the configuration information indicator further indicates a type of at least one filed included in a specific part of the header.

Preferably, the configuration information indicator indicates a specific one of at least two types previously typicalized for the at least a part of the configuration information of the data area and the header.

To further achieve these and other advantages and in accordance with the purpose of the present invention, a method of processing data at a specific protocol layer entity of a transmitting side in a wireless communication system, includes the steps of receiving size information on a data block transferable from the protocol layer entity to a lower layer entity for a unit transmission interval from the lower layer entity and if a data block cannot be constructed according to the size information, transferring at least one of information indicating that the data block cannot be constructed according to the size information and another size information on the data block that can be constructed at the protocol layer entity to the lower layer entity.

To further achieve these and other advantages and in accordance with the purpose of the present invention, a method of processing data at a specific protocol layer entity of a transmitting side in a wireless communication system, includes the steps of receiving information indicating a total quantity of data transferable from the protocol layer entity to a lower layer entity for a unit transmission interval from the lower layer entity and transferring data blocks to the lower layer entity sequentially in order of higher priority, priorities previously set to the data blocks based on the kinds the data block within a range of the total quantity of the transferable data.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, it is able to raise transmission efficiency of a data block at a specific protocol layer in a wireless communication system.

Secondly, data can be suitably transferred to a lower layer at a specific protocol layer in a wireless communication system.

Thirdly, data to a lower layer can be processed according to a prescribed priority at a specific protocol layer in a wireless communication system.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings.

Embodiments proposed by the present invention in the following description are applicable to a multi-carrier multiple access system considering mobility of a user equipment, e.g., to a wireless communication system using OFDM (hereinafter named 'OFDM wireless communication system). The present invention is applicable to the IEEE 802.16e system or the IEEE 802.16m system which is one of the standard systems for the OFDM wireless communication system [cf. IEEEStd 802.16e-2005 and http://www.ieee802.org/16/published.html for the relevant standard specifications. And, the present invention is applicable to such a similar wireless communication system as E-UMTS evolved universal mobile telecommunications system] called LTE (long term evolution). Moreover, the present invention is available for various communication systems using a single-antenna and a multi-antenna.

Generally, a communication system is deployed to provide various communication services including voice, packet data and the like. This technology is usable for downlink or uplink. The downlink means the communication to a user equipment from a base station, and the uplink means the communication to the base station from the user equipment. The base station is generally a fixed point communicating with a user equipment and means a network including upper layers as well as a physical transmitting end except a user equipment in a communication system. Therefore, a network or a base station in the present invention is a counterpart to a user equipment, and thus has the same meaning. Besides, a user equipment is fixed or can have mobility.

Figure 1:
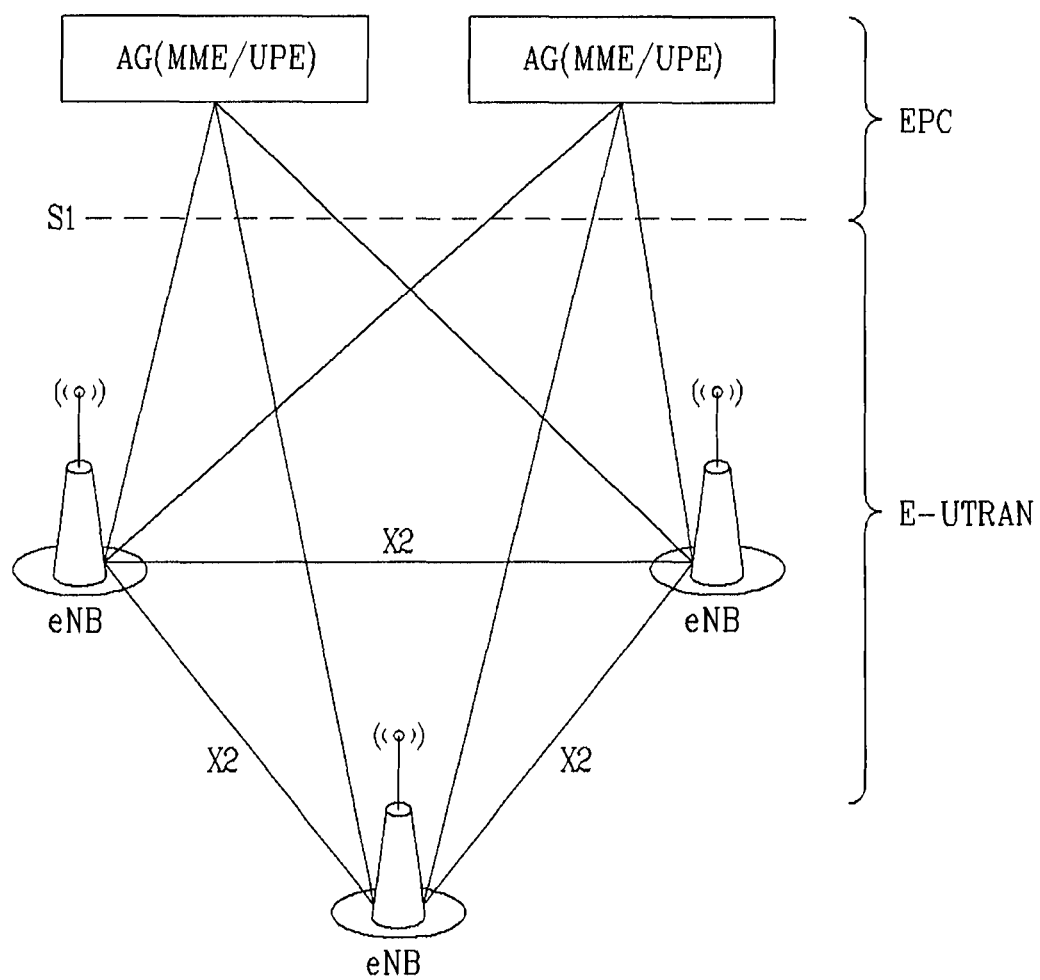
FIG. 1 is a diagram of a network structure of an E-UMTS (evolved universal mobile telecommunications system) which is the fourth generation wireless communication system.
Figure 2:
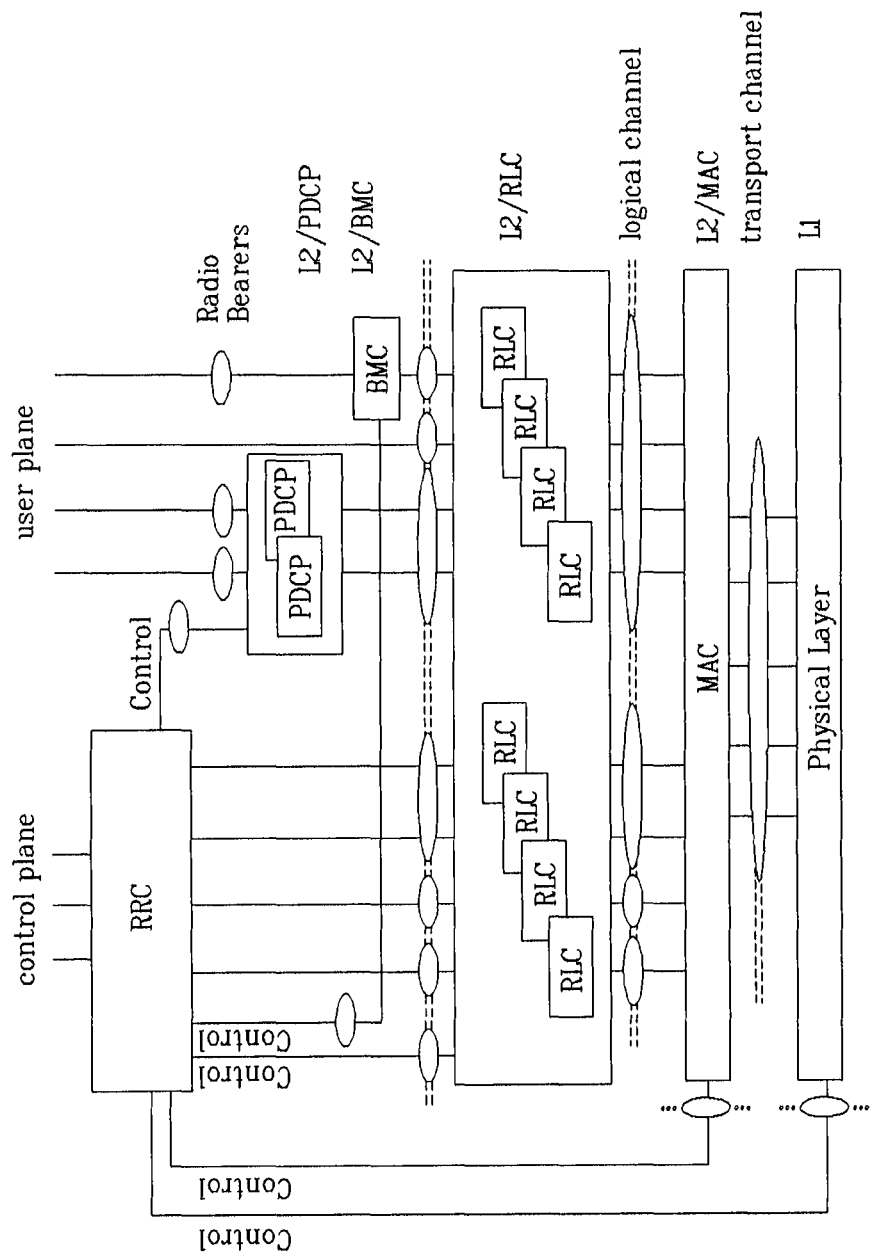
FIG. 2 is a diagram of a radio protocol layer structure between a user equipment and E-UTRAN (UMTS terrestrial radio access network) based on the radio access network specification of the 3GPP that is the third generation radio communication standardization organization.
Figure 3:
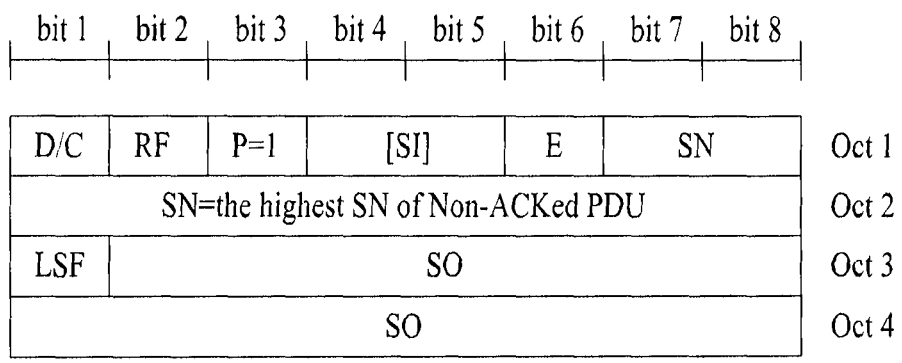
FIG. 3 is a diagram of a structure of a data block in a specific protocol layer according to one embodiment of the present invention.

FIG. 3 is a diagram of a structure of a data block in a specific protocol layer according to one embodiment of the present invention. In the embodiment shown in FIG. 3, a specific protocol layer is a RLC layer and a data block includes a header only.

RLC PDU, which is corresponding to a RLC layer data block generated at a RLC layer and then transferred to a lower layer such as a MAC layer, generally includes a RLC SDU corresponding to at least one upper layer data block and a header corresponding to a control information area for the RLC SDU. The header can include various fields according to an attribute of a specific protocol layer. In this case, the various fields include a field indicating a sequence number of the RLC PDU, a filed indicating the length of the upper layer data block, a field indicating a continuity/non-continuity of header information, a data block characteristic indication field indicating whether the generated RLC PDU is a control PDU or a data PDU, a field indicating whether a transmitting side requests a reception confirmation information to a receiving side and the like. Control information field within the header is explained in detail as follows.

First of all, a sequence number (SN) field indicates a sequence number of an AM RLC data block or a UM RLC data block. In an AM RLC data block segment that will be explained later, the sequence number field indicates a sequence number of an original AM RLC data block from which the corresponding AM RLC data block segment is generated.

An extension (E) field indicates whether a payload part corresponding to an upper layer data block (i.e., RLC SDU in this embodiment) or a part for control information (e.g., another extension field and a length field of the upper layer data block) comes to a next area.

A length indicator (LI) field indicates a length (represented by byte unit or one of other units) of the upper layer data block included in the data block of the RLC layer. The first length indicator within the header indicates a size of the first data block from an upper layer, the second length indicator within the header indicates a size of the second data block from the upper layer, and the $n^{th}$ length indicator within the header indicates a size of the $n^{th}$ data block from the upper layer.

A framing information (FI) field indicates whether the RLC SDU corresponding to the upper layer data block of the RLC layer is segmented at a start point and/or an end point of a data area in the RLC layer data block. In particular, the framing information field may indicate whether the first byte of the data area in the RLC layer data block corresponds to the first byte of the RLC SDU and whether the last byte of the data area in the RLC layer data block corresponds to the last byte of the RLC SDU.

Table 1 shows an example for contents according to a bit value of a 2-bit FI field.

TABLE 1

| FI field value (2 bits) | Contents |
|---|---|
| 00b | First byte of data area corresponds to the first byte of a RLC SDU. Last byte of data area corresponds to the last byte of a RLC SDU. |
| 01b | First byte of data area corresponds to the first byte of a RLC SDU. Last byte of data area does not correspond to the last byte of a RLC SDU. |
| 10b | First byte of data area does not correspond to the first byte of a RLC SDU. Last byte of data area corresponds to the last byte of a RLC SDU. |

TABLE 1-continued

| FI field value (2 bits) | Contents |
|---|---|
| 11b | First byte of data area does not correspond to the first byte of a RLC SDU. Last byte of data area does not correspond to the last byte of a RLC SDU. |

A segment offset (hereinafter abbreviated SO) field indicates a position of an AM RLC PDU segment by byte unit within an original AM RLC PDU. In particular, the segment offset field indicates a position within a data area of an original RLC PDU which corresponds to the first byte of a data area of an AM RLC PDU segment.

A last segment flag (hereinafter abbreviated LSF) field indicates whether a RLC PDU segment includes the last part of a RLC PDU.

A data/control (hereinafter abbreviated D/C) field indicates whether a RLC PDU is a RLC data PDU or a RLC control PDU. In particular, the D/C field can be regarded as a data block characteristic indication field which indicates whether a data block is for a control information or a data information.

A re-segmentation flag (hereinafter abbreviated RF) indicates whether a RLC PDU is an AM RLC PDU or an AM RLC PDU segment.

An information associated with polling (polling: hereinafter abbreviated P) field indicates whether an AM RLC entity of a transmitting side is makes a request for transmission/reception acknowledgement information on at least one AM RLC PDU to a corresponding AM RLC entity of a receiving side.

A control PDU type (hereinafter abbreviated CPT) indicates a type of a RLC control PDU. For instance, a RLC control field can be a status PDU.

An acknowledgement sequence number (hereinafter abbreviated ACK_SN) field indicates a lowest SN of AM RLC PDUs received by an AM RLC entity of a receiving side or a SN next to a highest SN of RLC PDUs received by the receiving side.

A negative acknowledgement (ACK) sequence number (hereinafter abbreviated NACK_SN) indicates a SN of an AM RLC PDU determined as a loss by a receiving side of an AM RLC entity.

A SO field indicates whether a first part included in a RLC PDU segment corresponds to which part of an original RLC PDU. Namely, the SO field indicates offset information.

SO start (SOstart) field and SO end (SOend) field indicate offset information on start and end of a part, that failed to be received, in a RLC PDU that uses a sequence number NACK_SN due to failing to be completely received by a receiving side. Whether to use the above-described parameters of the RLC layer is determined according to operation modes of the RLC layer, i.e., AM, UM or TM.

As mentioned in the foregoing description, an AM RLC layer supports a retransmission function for an AM RLC layer data block (AM RLC PDU) which failed to be received by a receiving side. This is performed in a manner that the receiving side transmits, to a transmitting side, an acknowledgement information requesting a retransmission of a specific AM RLC PDU and in a manner that the transmitting side checks the acknowledgement information and then retransmits the specific AM RLC PDU to the receiving side. Alternatively, if the receiving side receives the AM RLC PDU from the transmitting side, the receiving side itself can always transmit an acknowledgement information indicating whether the AM RLC PDU was successively received by the receiving side to the transmitting side.

Yet, the acknowledgement information transmitted by the receiving side may be also lost on a radio channel. If the transmitting side expects the loss on the radio channel or if the transmitting side determines that a transmission of the acknowledgement information from the receiving side is necessary due to another specific reason, the transmitting side is able to make a request for the transmission of the acknowledgement information on an AM RLC PDU having a specific sequence number or an AM RLC PDU having a sequence number within a specific range. This is called a polling procedure as mentioned in the foregoing description.

According to one embodiment of the present invention, if a transmitting side transmits its AM RLC PDU after setting the polling request field in the AM RLC PDU to a positive value (e.g., 1) in order to indicate that a polling is requested, a receiving side checks a header of the received RLC PDU. If the polling request field is set to 1, the receiving side generates an acknowledgement information to the AM RLC PDU having a corresponding sequence number and then may transmit the acknowledgement information to the transmitting side. Alternatively, after the receiving side has checked a header of the received RLC PDU, if the polling request field is set to 1, the receiving side generates an acknowledgement information to the AM RLC PDUs having up a corresponding sequence number and is then able to transmit the acknowledgement information to the transmitting side.

In this case, if there exists an AM RLC PDU to be transmitted to the receiving side by the transmitting side, a polling request field set to make a request for acknowledgement information can be included within a header of the AM RLC PDU to be transmitted.

On the contrary, if the transmitting side has no AM RLC SDU corresponding to an upper layer data block to be transmitted to the receiving side, the transmitting side may transmit an AM RLC PDU including the polling request field which is set to make a request for an acknowledgement information and an AM RLC SDUs which used to be included in an AM RLC PDU having a highest sequence number among AM RLC PDUs previously transmitted, to the receiving side.

Alternatively, when the transmitting side transmits a polling request field, an AM RLC PDU consisting of a header only is constructed and the polling request field set to request an acknowledgement information can be included within the header. To support this, in case that the receiving side receives a predefined AM RLC PDU, if there is a header in the received AM RLC PDU even when the AM RLU has no data area corresponding to an AM RLC SDU, the receiving side recognizes the received AM RLC PDU as a normal AM RLC PDU and then processes the corresponding AM RLC PDU. In the above procedure, the receiving side may check a polling request field included in the corresponding AM RLC PDU and then check whether the polling request field is set to request a transmission of acknowledgement information.

As a result of the check, if the polling request field is set to request a transmission of acknowledgement information, the receiving side may transmit the acknowledgement information to the transmitting side. The acknowledgement information indicates whether a certain AM RLC PDU for which the transmitting side requested the acknowledgement information is successively received by the receiving side.

A polling request filed occupies an area of at least one bit. If a transmitting side makes a request for a polling, the polling request field can be set to a binary bit except 0. If the polling is not requested, the polling request field can be set to 0.

Alternatively, the polling request filed can be set to the contrary according to a system operating environment.

To enable a receiving side to know for which AM RLC PDU a transmitting side request an acknowledgement information, the following methods are available.

First of all, a receiving side is able to transmit acknowledgement information only for an AM RLC PDU corresponding to a sequence number written in a SN field of a header having a polling request field set by a transmitting side to make a request for a transmission of the acknowledgement information.

Alternatively, by setting an AMC RLC PDU, which corresponds to a sequence number written in a SN field of a header having a polling request field set by a transmitting side to make a transmission of acknowledgement information, to a last number and setting an initial sequence number to a start number or by setting a sequence number next to an AM RLC PDU for which acknowledgement information has been transmitted to a start number, it is able to transmit acknowledgement information on AM RLC PDU having a sequence number between the start number and the last number.

Alternatively, by receiving a start sequence number and a last sequence number of AM RLC PDUs for which a transmission of acknowledgement information is requested from a transmitting side, it is able to transmit acknowledgement information on AM RLC PDU having a sequence number between the start number and the last number.

Alternatively, by receiving an information on a sequence number of at least one AM RLC PDU for which a transmission of acknowledgement information is requested from a transmitting side, it is able to transmit the acknowledgment information on the AM RLC PDU corresponding to the sequence number.

Looking into an AM RLC PDU shown in FIG. 3 according to one embodiment of the present invention, the AM RLC PDU includes a 4-byte (i.e., 4-octet, where 1 octet corresponds to 1 byte) control information field area corresponding to a header only. Roles of various control information fields shown in FIG. 3 have been explained in the foregoing description. In an embodiment shown in FIG. 4, information on an AM RLC PDU for which a transmitting side requests a transmission of acknowledgement information to a receiving side is represented in a SN field. In particular, the embodiment shown in FIG. 4 exemplifies a case that a receiving side performs a transmission by setting a sequence number of the SN field to a last number. Namely, the receiving side may set a next sequence number of an AM RLC PDU for which acknowledgment information was transmitted last to a start number or set a sequence number of an initial AM RLC PDU to a start number.

As mentioned in the foregoing description, in case that the AM RLC PDU shown in FIG. 3 is an AM RLC PDU segment, a SO field indicates whether the AM RLC PDU segment includes a last part of the AM RLC PDU. In the embodiment shown in FIG. 3, the SO field can be set to a sequence number of an AM RLC PDU having a highest value, i.e., a highest sequence number among sequence numbers of AM RLC PDUs on which a transmitting side is waiting for acknowledgement information. If a receiving side receives the AM RLC PDU, the receiving side determines that a size of RLC having up to a sequence number indicated by the AM RLC PDU is equal to the SO field, constructs an acknowledgment information and then transmits the constructed acknowledgement information to a transmitting side.

If the receiving side receives the AM RLC PDU including the header only, i.e., if the receiving side receives the AM RLC PDU which doesn't have a data area corresponding to an AM RLC SDU, the receiving side determines whether to transmit an acknowledgement information by checking a polling request field included within the header. In this case, if the polling request field is not set to request a transmission of the acknowledgement information (i.e., negative setting), it may delete the received AM RLC PDU. Alternatively, in case of receiving an AM RLC PDU which doesn't have a data area, the receiving side determines that it is a message for requesting an acknowledgment information. The receiving side then may transmit the acknowledgment information by referring to a sequence number included in the header.

Figure 4:
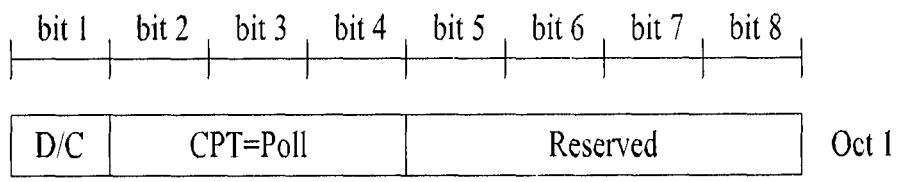
FIG. 4 is a diagram of a structure of a data block in a specific protocol layer according to another embodiment of the present invention.

FIG. 4 is a diagram of a structure of a data block in a specific protocol layer according to another embodiment of the present invention. A specific protocol layer in an embodiment shown in FIG. 4 is a RLC layer.

Unlike the embodiment shown in FIG. 3, an embodiment shown in FIG. 4 reduces a size of an AM RLC PDU using an AM RLC control PDU, instead of transmitting an AM RLC PDU which doesn't have an AM RLC SDU in order for a transmitting side to make a request for an acknowledgment information to a receiving side.

Various control information fields of the AM RLC control PDU shown in FIG. 4 have been explained in the foregoing description. By representing a D/C filed as 'control' (i.e., 'C'), a CPT field can be made to play a role as the polling request field of the embodiment shown in FIG. 3. NACK_SN field can be set to play a role as the SN field of the embodiment shown in FIG. 3. In this case, by using ACK_SN field together, it is able to request a transmission of acknowledgment information on an AM RLC PDU having a sequence number indicated by the NACK_SN field from a sequence number indicated by the ACK_SN field. Alternatively, by using SOstart filed and SOend field together, it is able to obtain information on initial and final sequence numbers of an AM RLC PDU for which a transmission of acknowledgement information is requested.

Figure 5:
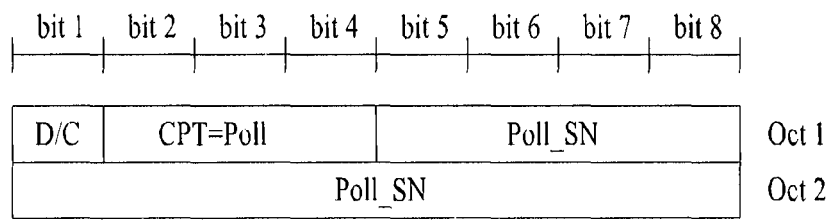
FIG. 5 is a diagram of a structure of a data block in a specific protocol layer according to another embodiment of the present invention.

FIG. 5 is a diagram of a structure of a data block in a specific protocol layer according to another embodiment of the present invention. A specific protocol layer in an embodiment shown in FIG. 5 is a RLC layer.

A data block according to an embodiment shown in FIG. 5 includes a configuration of a new header proposed to represent a polling request field using an AM RLC control PDU. In particular, the header occupies 1 byte only to reduce a size of the AM RLC control PDU.

A transmitting side represents a D/C field as 'control' (i.e., represented as 'C') and sets a CPT field to a value indicating that a polling is requested (i.e., the CPT field plays a role as a polling request field). If a receiving side receives an AM RLC control PDU where the CPT field is set to the value for requesting the polling, the receiving side can transmit an acknowledgement information on all AM RLC PDUs received after reception of the AM RLC control PDU, can transmit an acknowledgement information on the AM RLC PDUs including from the AM RLC PDU for which the acknowledgement information has been transmitted last to the AM RLC PDU received most recently, or can transmit an acknowledgement information on the most recently received AM RLC PDU only.

Although the embodiment shown in FIG. 5 exemplifies a case that the CPT field is consisting of 3 bits, a length of the CPT field is adjustable according an operational scheme of a system operator and the CPT field may represent various meanings. Table 2 shows an example for contents according to a bit value in case of using a 2-bit CPT field as a polling request field.

TABLE 2

| CPT bit value | Contents |
| --- | --- |
| 00b | Not request a polling |
| 01b | Request Acknowledgement information on the most recently received AM RLC PDU |
| 10b | Request Acknowledgement information on two most recently received AM RLC PDUs |
| 11b | Request Acknowledgement information on three most recently received AM RLC PDUs |

The number of bits occupied the above CPT field is adjustable according to a system operating environment and contents of the CPT field can be modified.

Figure 6:
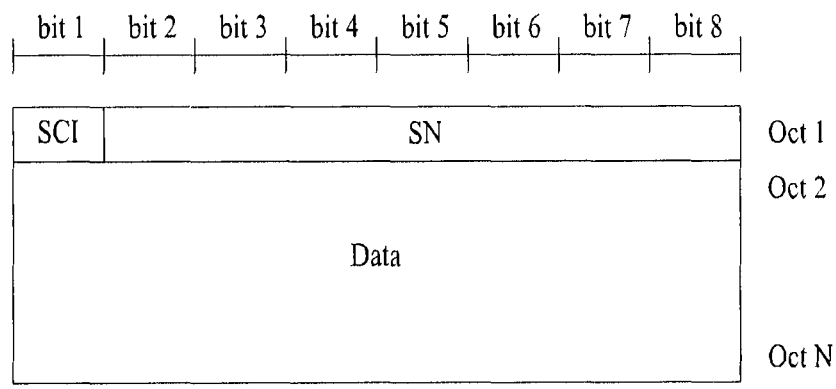
FIG. 6 is a diagram of a structure of a data block in a specific protocol layer according to another embodiment of the present invention.

FIG. 6 is a diagram of a structure of a data block in a specific protocol layer according to another embodiment of the present invention. A specific protocol layer in an embodiment shown in FIG. 6 is a RLC layer. A data block according to the embodiment shown in FIG. 6 includes another configuration of a new header proposed to represent a polling request field using an AM RLC control PDU. In particular, the header occupies 2 bytes only to reduce a size of the AM RLC control PDU.

In the AM RLC control PDU, a D/C field is represented as 'control' and a CPT field is used as a polling request field. In order for a transmitting side to represent its attempt to receive an acknowledgement information on AM RLC PDU having up a certain sequence numbers, the sequence number of a specific AM RLC PDU can be written in a Poll_SN. For instance, the transmitting side sets the Poll_SN value to a highest one of sequence numbers of AM RLC PDUs transmitted by the transmitting side and then may transmit the corresponding value.

Another method (not shown in FIG. 6) of using Poll_SN is explained as follows. First of all, the Poll_SN is subdivided into Poll_SN1 for indicating a start sequence number of an AM RLC PDU requesting a polling and Poll_SN2 for indicating an end sequence number. If a receiving side receives an AM RLC control PDU including a CPT corresponding to a polling request field set to request a polling, the receiving side constructs an acknowledgement information according to the Poll_SN operating scheme explained in one of the descriptions for the embodiments shown in FIGS. 3 to 5, and then transmits the constructed acknowledgement information.

A method of transmitting a data block generated by one of the embodiments shown in FIGS. 3 to 6 a transmitting side is explained as follows.

First of all, a transmitting side generates a data block including polling information to make a request for a transmission of acknowledgement information (status report) for at least one data block transmitted to a receiving side. The transmitting side then transmits the data block to the receiving side. As shown in the embodiments shown in FIGS. 3 to 6, the data block does not include upper layer data.

Figure 7:
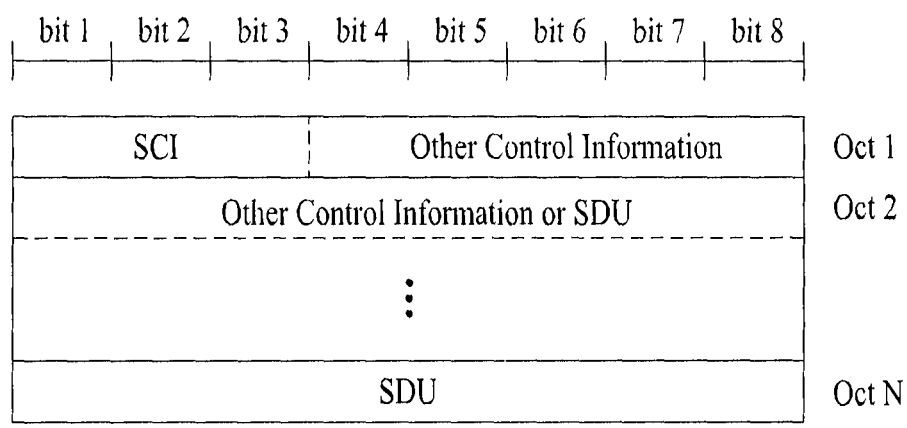
FIG. 7 is a diagram of a structure of a data block in a specific protocol layer according to another embodiment of the present invention.

FIG. 7 is a diagram of a structure of a data block in a specific protocol layer according to another embodiment of the present invention. The embodiment shown in FIG. 7 relates to a UM RLC layer which is mainly used for a voice or video call without supporting a retransmission function as a specific protocol layer.

In case of a voice call, data in similar size are transferred to a UM RLC layer from an upper layer (e.g., in case of 12.2 kbps voice call, a voice data block of 35-49 bytes can be transferred by a period of 20 ms for a call interval). Since the size is not large, a single RLC SDU is usually included within a single RLC PDU. In the embodiment shown in FIG. 7, a header is made to use a small radio resource only in a manner of adjusting a control information area field of a header to be suitable for a characteristic of a lower layer data block (hereinafter named UM RLC PDU) of the UM RLC layer.

In the embodiment shown in FIG. 7, a configuration information indicator represented with at least one bit indicating a configuration of at least one upper layer data block (i.e., SDU) occupying at least 1-bit size and a configuration information of a header area is included in a header of UM RLC PDU. The configuration information indicator may indicate at least one of information on whether an upper layer data block included in a data area is segmented, whether the number of the upper layer data block included in the data area is single or plural if not segmented and that a part included in the data area corresponds to which segmented parts if the upper layer data block is segmented. The configuration information indicator may indicate a specific one of at least two types previously typicalized for at least one part of the configuration information of the data area and the header.

In the following embodiment, the configuration information indicator is named a SDU configuration indicator (hereinafter abbreviated SCI). Namely, the SCI indicates at least one of configuration information indicating what configuration is used for UM RLC SDUs in data area of UM RLC PDU and configuration information indicating what kind of a control information field is configured in a header area after the SCI field.

Table 3 shows one embodiment for contents of SCI field according to a bit value in case of using 2-bit SCI field.

TABLE 3

| SCI bit value (2 bits) | Contents |
| --- | --- |
| 00b | One SDU is included within UM RLC PDU, the SDU is in a next octet of SCI field, and the SDU is a one complete UM RLC PDU not divided into several RLC UM RLC PDUs. |
| 01b | E/LI field exists in a next octet of SCI field, a plurality of SDUs exist within the corresponding UM RLC PDU, and data of the SDUs are included in the UM RLC PDU only. |
| 10b | SDU exists from a next octet of SCI field, SDU in the next octet is not one complete SDU as well as does not correspond to a first or last byte of the SDU. |
| 11b | E/LI field exists in a next octet of SCI field, SDU exists from the next octet, and the SDU is not one complete SDU but corresponds to either a first or last byte of the SDU. |

Figure 8A:
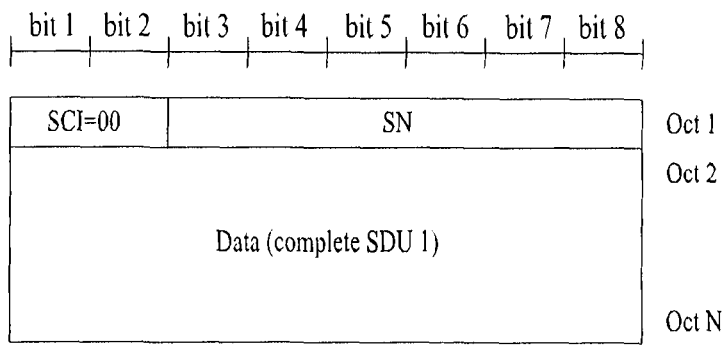
FIGS. 8A to 8E are diagrams of a structure of a data block in a specific protocol layer according to another embodiment of the present invention.
Figure 8B:
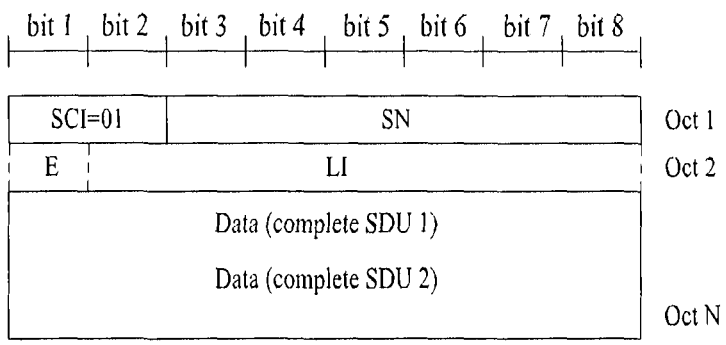

FIGS. 8A to 8E are diagrams of a structure of a data block in a specific protocol layer according to another embodiment of the present invention. Lower layer data blocks shown in FIG. 8A and FIG. 8B are embodiments of UM RLC PDU data block structure according to SCI bit value written in Table 3.

The UM RLC PDU shown in FIG. 8A is a data block structure when a bit value of SCI field in Table 3 is '00'. In particular, as represented in Table 3, FIG. 8A shows a UM RLC PDU which contains a header having a 1-byte length and one complete SDU.

The UM RLC PDU shown in FIG. 8B is a lower layer data block structure when a bit value of SCI field in Table 3 is '01'. In particular, as represented in Table 3, FIG. 8B shows a UM RLC PDU which contains a header including 1 octet of a SCI field and 1 octet of an E/LI field and two complete SDUs. The E/LI field is explained in the foregoing description.

Figure 8C:
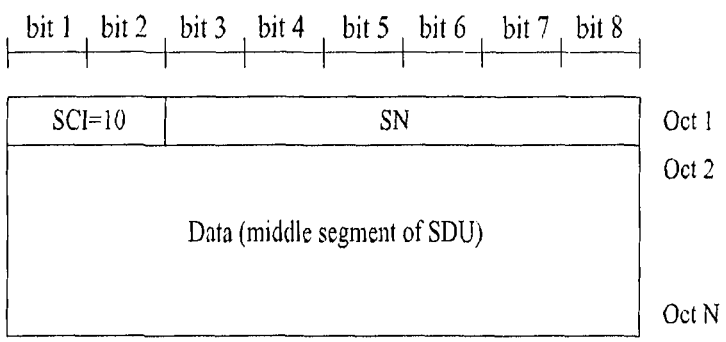

The UM RLC PDU shown in FIG. 8C is a lower layer data block structure when a bit value of SCI field in Table 3 is '10'. In particular, as represented in Table 3, FIG. 8C shows a UM RLC PDU which contains 1 octet including a SCI field and a part of a single SDU right next to the 1 octet as a part of a specific SDU which does not correspond to neither the first octet nor the last octet.

Figure 8D:
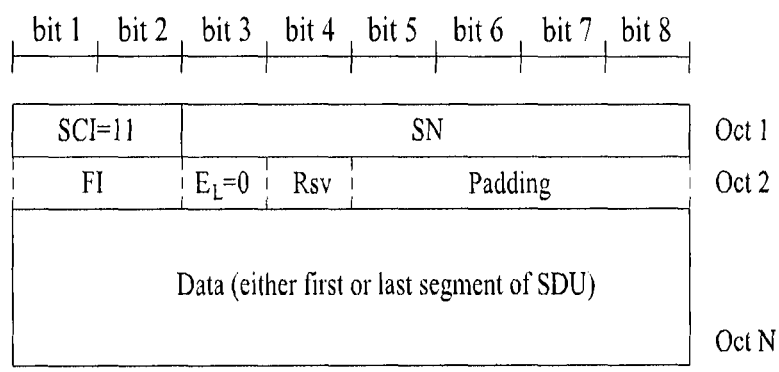

The UM RLC PDU shown in FIG. 8D is a data block structure when a bit value of SCI field in Table 3 is '11'. In particular, as represented in Table 3, FIG. 8D shows a UM RLC PDU which contains a header including 1 octet having a SCI field and 1 octet having an E/FI field, and a SDU as a part of a specific SDU which does not correspond to either the first octet or the last octet.

Figure 8E:
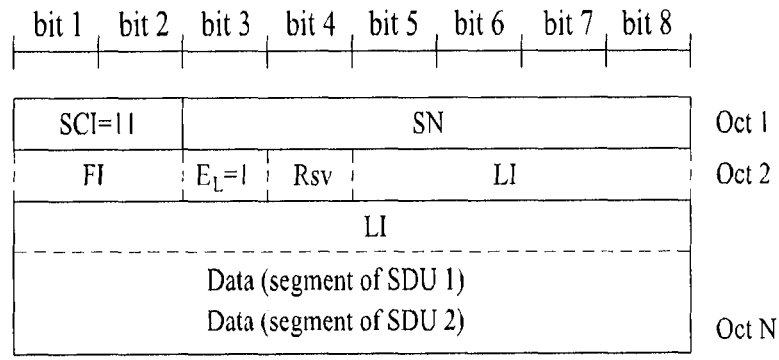

A lower layer data block shown in FIG. 8E shows another embodiment of a UM RLC PDU data block structure constructed to have the structure difference from that shown in FIG. 8D, in case that a SCI bit value shown in Table 3 is '11'. In particular, FIG. 8E shows a case that if a CSI field value in Table 3 is '11', an E/LI field exists in a next octet of the CSI field, and at least a part of a plurality of SDUs exist from a next octet. In this case, a part of the SDU corresponds to the first octet, the last octet or the like or may correspond to a middle octet.

Figure 9:
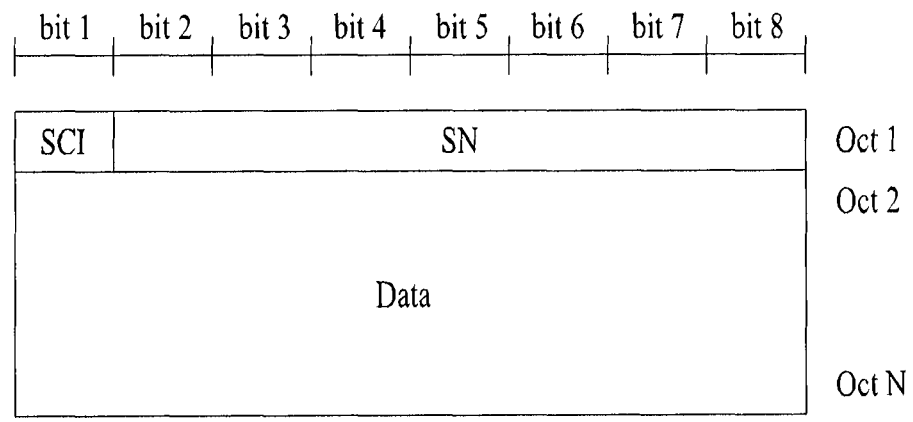
FIG. 9 is a diagram of a structure of a data block in a specific protocol layer according to another embodiment of the present invention.

FIG. 9 is a diagram of a structure of a data block in a specific protocol layer according to another embodiment of the present invention. A lower layer data block according to an embodiment shown in FIG. 9 includes a header, which basically includes 1 octet containing a SCI field and is able to further include 1 octet for control information according to a value of the SCI field, and a data area. And, a SDU having a configuration indicated by contents of the SCI field is allocated to the data area.

Table 4 relates to the embodiment shown in FIG. 9 and represents contents of a SCI field according to a bit value if the SCI field includes 1 bit only.

TABLE 4

Figure 10A:
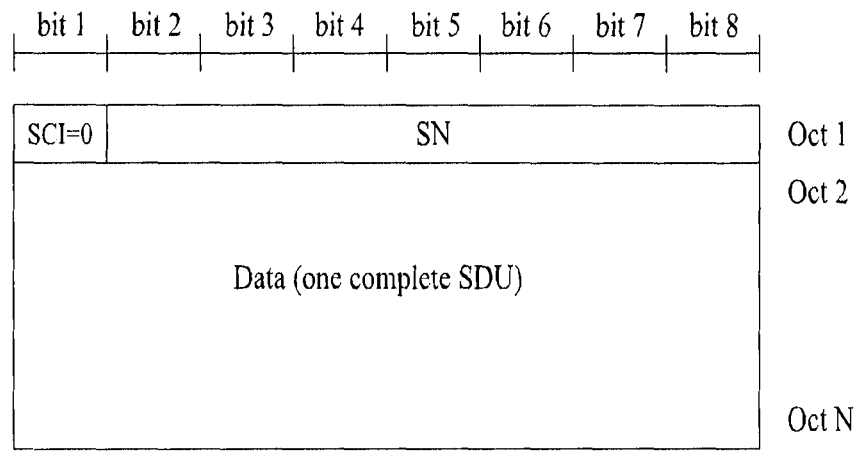
FIGS. 10A to 10C are diagrams of a structure of a data block in a specific protocol layer according to a further embodiment of the present invention.
Figure 10B:
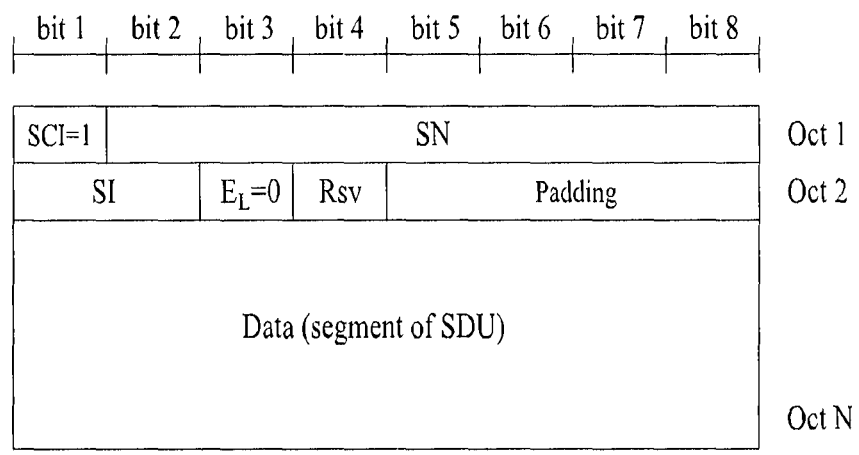
Figure 10C:
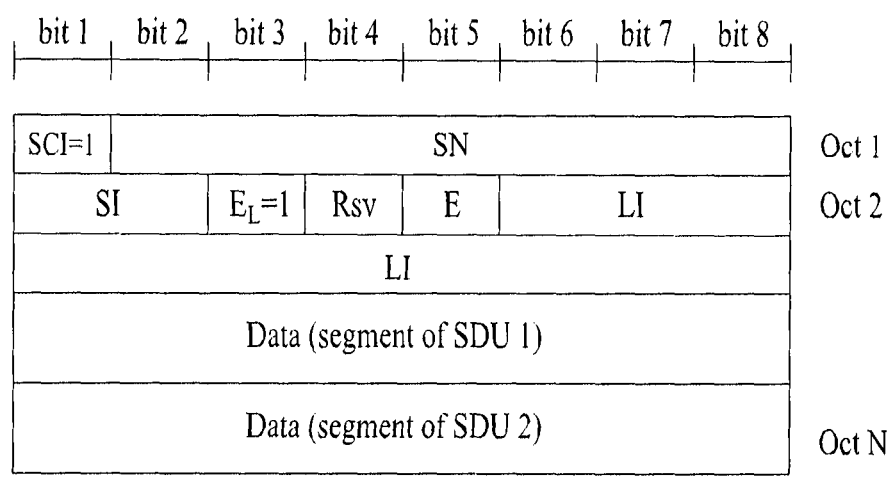

| SCI field value (1 bit) | Contents | Remarks |
|---|---|---|
| 0 | Data area begins from the octet next to an octet including a SCI field and one complete SDU is included in a current UM RLC PDU. | Corresponding to FIG. 10A |
| 1 | The octet next to an octet including a SCI field includes FI, E and LI fields and a data area begins from a subsequent octet. | Corresponding to FIG. 10B and FIG. 10C |

FIGS. 10A to 10C are diagrams of a structure of a data block in a specific protocol layer according to a further embodiment of the present invention.

The UM RLC PDU according to the embodiment shown in FIG. 10A relates to a case that a value of a SCI field is 0. In particular, the UM RLC PDU includes a header of 1 octet having a SCI field, and a data area having one complete UM RLC SDU.

The UM RLC PDU according to the embodiment shown in FIG. 10B includes a header of a 2-octet length including an octet of a SCI field and a next octet including SI and E fields, and a UM RLC SDU from a next octet which corresponds to a data area. The present embodiment relates to a case that a part of one specific UM RLC SDU is allocated to the data area.

The UM RLC PDU according to the embodiment shown in FIG. 10C includes a header of 3-octet length, which includes an octet having a SCI field and two next octets having SI, E and LI fields, and a UM RLC SDU from a subsequent octet which corresponds to a data area. The present embodiment relates to a case that parts of two specific SDUs are allocated to the data area.

An embodiment for transmitting a lower layer data block of a specific protocol layer shown in any one of FIGS. 7 to 10 from a transmitting side to a receiving side is explained as follows.

First of all, at least one data block (SDU) is received from an upper layer. Subsequently, a lower layer data block, which includes a data area including at least a part of the at least one data block from the upper layer and a configuration information indicator indicating at least a part of configuration information of the data area and the header, is generated. The above-generated lower layer data block is then transmitted to a receiving side.

Figure 11:
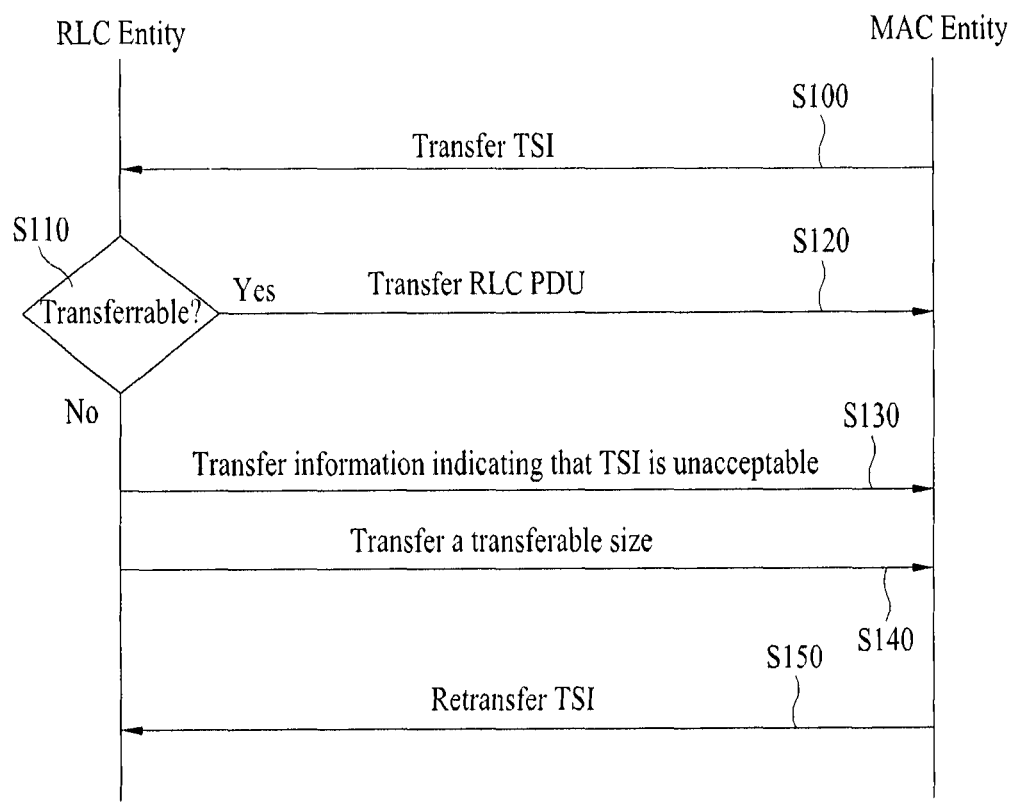
FIG. 11 is a flowchart for a method of transmitting a data block through control information transmission and reception between specific protocol layers according to another embodiment of the present invention.

FIG. 11 is a flowchart for a data processing method in a specific protocol layer entity of a transmitting side in a wireless communication system according to a further embodiment of the present invention. A MAC layer entity corresponding to a lower layer of the above-mentioned RLC layer performs a radio resource management function and a measurement function. The radio resource management function is responsible for controlling a transmission of data in a manner of setting an operation of a MAC layer based on various MAC parameters transferred from a radio resource control layer, that is a upper layer, instead of being performed by the MAC layer itself. For instance, the radio resource management function corresponds to a function of modifying a mapping relation between a logical channel and a transport channel, a function of multiplexing and transferring data by a scheduling function, or the like. The measurement function means a function of measuring a traffic size and then reporting the measured traffic size to an upper layer. The upper layer is able to modify a setting of the MAC layer based on the information measured by a MAC layer entity. Through this, it is able to efficiently manage radio resources.

A detailed operational procedure of the embodiment shown in FIG. 11 is explained as follows. First of all, as one of radio resource management functions in a MAC layer, a MAC entity responsible for input/output and control of the MAC layer transfers a transfer size indicator (TSI), which is a size information on a data block, which can be transferred to the MAC layer from a RLC layer entity for a unit transfer interval, to a RLC layer as a upper layer of the MAC layer [S100]. In this case, the unit transfer interval can correspond to a data transfer interval between a MAC layer and a physical layer and may include a transmit transmission interval (TTI) or the like. According to a system operating environment, a detailed period of the unit transfer interval is modifiable. If a unit transfer interval different from the TTI may be used between the RLC layer and the MAC layer, the different unit transfer interval is usable as well.

An RLC entity responsible for input/output and control receives the transfer size indicator and then decides whether a RLC PDU can be generated to match a size indicated by the transfer size indicator [S110].

If deciding that the RLC PDU can be generated to match the size indicated by the transfer size indicator, the RLC entity generates a RLC PDU matching the size of the transfer size indicator and then transfers the generated RLC PDU to the MAC layer which is the lower layer [S120].

Yet, if the RLC entity is currently unable to generate and transfer the RLC PDU matching the size indicated by the transfer size indicator to the MAC layer, the RLC entity informs the MAC layer that it is unable to generate a RLC PDU in a size indicated by the transfer size indicator [S130].

Subsequently, since the RLC entity is not able to generate a RLC PDU matching the size indicated by the transfer size indicator, the RLC entity performs no action until receiving another instruction from the MAC entity or actively informs the MAC entity that the RLC layer fails to have data enough to the size indicated by the transfer size indicator. For this, the RLC entity may deliver information indicating that the transfer size indicator is not acceptable [S130].

Alternatively, the RLC entity is able to transfer information, which relates to a size of a RLC PDU currently transferable to the MAC layer, to the MAC entity [S140]. Alternatively, the RLC entity is able to transfer information on a size of a RLC PDU that can be constructed as close as possible to the transfer size indicator delivered by the MAC entity to the MAC layer [S140]. In case of receiving the information on the configurable RLC PDU from the RLC layer by the step S130 or S140, the MAC entity is able to newly transfer another transfer size indicator, which is made to match a size of the RLC PDU that can be generated and transferred by the RLC entity, to the RLC entity [S150].

The embodiment shown in FIG. 11 is described in the relation between a single MAC entity and a single RLC entity, which can be extended to the relations between a single MAC entity and a plurality of RLC entities in the same manner. In particular, the MAC entity is able to transmit a transfer size indicator to each of the RLC entities. And, each of the RLC entities is able to decide whether to transmit a RLC PDU by the procedure according to the embodiment shown in FIG. 11 in its situation.

Another embodiment of the present invention proposes a transferring method considering a characteristic of RLC PDU in case that the RLC entity transfers a RLC PDU to the MAC entity according to the transfer size indicator in the step S120 shown in FIG. 11. In particular, a RLC entity is able to generate and transfer at least one RLC PDUs to a MAC entity according to a transfer size indicator. In this case, the RLC entity may give a priority to a transfer by considering whether the generated RLC PDU is a RLC control PDU, a RLC PDU waiting for retransmission, a newly generated RLC PDU or the like and then transfer the generated RLC PDU to the MAC entity. On embodiment of a detailed operational process is explained as follows.

First of all, for example of a transfer priority in transferring a RLC PDU to a MAC layer from a RLC layer, the first priority is given to a RLC control PDU, a second priority is given to a RLC PDU (RLC PDU segment included) in a standby mode for retransmission, and a third priority is given to a newly generated RLC PDU to transfer. In this case, the meaning of the transmission may indicate a retransfer to a MAC layer from a RLC layer of a transmitting side or a retransmission to a RLC layer of a receiving side from a RLC layer of a transmitting side.

According to the determined transfer priority, a RLC entity transfers a RLC PDU to a MAC entity to meet a total quantity (named RLC_MAX) indicated by a transfer size indicator transferred from the MAC entity. In this case, the RLC entity manages a remaining quantity (named RLC_Remain in the embodiment) of data transferable to the MAC layer managed by the MAC entity. an initial value of the data remaining quantity is equal to RLC_MAX.

In particular, the RLC entity preferentially checks whether a RLC control PDU to be transferred exists. If the RLC control PDU to be transferred exists, the RLC entity generates at least one RLC control PDU within a range of RLC_MAX and then transfers the generated at least one RLC control PDU to the MAC entity. In this case, assuming that a size of the generated and transferred at least one RLC control PDU is K, the RLC_Remain becomes RLC_MAX-K.

If the total quantity of the data to be transferred to the MAC layer fails to be met despite transferring the RLC control PDU (i.e., if a value of RLC_Remain is greater than 0), the RLC entity checks whether there exists a RLC PDU to be retransmitted (RLC data PDU except RLC control PDU). If the RLC PDU to be transmitted exists, RLC PDU can be transferred to the MAC layer by allocating a resource to a RLC PDU with a header having a lower sequence number in the first place. In this case, if a size of the RLC PDU to be retransmitted is greater than RLC_Remain, resources for retransmission are allocated in a manner of reconstructing the RLC PDU into at least two RLC PDU segments. Each time the RLC PDU is transferred to the MAC layer, the RLC_Remain is reduced by a size of the least one RLC PDU or RLC PDU segment having been transferred to the MAC layer for the retransmission.

After the at least one RLC PDU or RLC PDU segment has been transferred, if the RLC_Remain is greater than 0, the remaining resource quantity is used for generation and transfer of new RLC PDU. In this case, if the RLC_Remain is smaller than a size of a header of a RLC PDU to be newly generated, the RLC entity may not generate and transfer the RLC PDU. In particular, if the RLC_Remain is equal to or smaller than a minimum header size varying according to an operating modes (TM, UM, AM) of the RLC layer, the RLC entity does not generate the RLC_PDU. Only if the minimum header size is greater than the RLC_Remain, the RLC entity generates and transfers the RLC PDU to the MAC layer.

In the above description, for clarity and convenience of explanation of the present invention and its embodiments, although a communication performing process between a transmitting side and a receiving side is mainly explained, the transmitting side may correspond to a user equipment or a base station of a network and the receiving side may correspond to the base station of the network or the user equipment. Terminologies used in this disclosure can be replaced by other terminologies having the same meanings, respectively. For instance, a terminal can be replaced by one of a mobile station, a mobile terminal, a communication terminal, a user equipment, a user device and the like. And, a base station can be replaced by one of a fixed station, a Node B (NB), an eNB and the like.

The above-described embodiments include the combinations of the elements and features of the present invention in a prescribed form. Each of the elements and features should be considered selective unless there is a explicit mention. Each of the elements or features can be implemented in a manner of not being combined with another element or feature. Moreover, a embodiment of the present invention can be configured by combining elements and/or features in part. Order of operations explained in the description for the embodiments of the present invention can be modified. Some configuration or feature of a prescribed embodiment can be includes in another embodiment or can be replaced by corresponding configuration or feature of another embodiment. And, it is apparent that a embodiment is configured by combining claims not in a explicit citation relation together or that a new claim can be included by correction after application filing.

Embodiments according to the present invention can be implemented by various means such as hardware, firmware, software and any combinations thereof. In case of the implementation by hardware, one embodiment of the present invention can be implemented by at least one selected from the group consisting of ASICs (application specific integrated circuits), DSPs 9digital signal processors), DSPDs (digital signal processing devices), PDLs (programmable logic devices), FPGAs (field programmable gate arrays), processors, controllers, microcontroller, microprocessors and the like.

In case of the implementation by firmware or software, one embodiment of the present invention can be implemented in forms of modules, procedures, functions and the like for performing the above-explained functions or operations. Software code is stored in a memory unit and can be then driven by a processor. The memory unit is provided within or outside the processor to exchange data with the processor via various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to a wireless communication system. In particular, the present invention is applicable to data block transferring and processing methods in a specific protocol layer of a wireless communication system.

What is claimed is:

1. A method of processing data at a specific protocol layer entity of a transmitting side in a wireless communication system, the method comprising the steps of:

receiving a size information on the data block transferable from the protocol layer entity to a lower layer entity for a unit transmission interval from the lower layer entity; and if a data block cannot be constructed according to the size information, transferring at least one of an information indicating that the data block cannot be constructed according to the size information and another size information on the data block that can be constructed at the protocol layer entity to the lower layer entity, wherein if the another size information on the data block that can be constructed at the protocol layer is transferred to the lower layer entity, the another size information on the data block having the smallest difference from the size information on the data block transferable for the unit transmission interval which is received from the lower layer entity is transferred, wherein a header of the data block includes a segment offset (SO) field including length information of the data block having the highest sequence number among the at least one data blocks, and a framing information (FI) field indicating whether the data block is segmented at a start point or end point of a data area in the data block, wherein the protocol layer entity receives a size information on the data block transferable to the lower layer entity for the unit transmission interval reflecting the another size information on the data block that can be constructed at the protocol layer entity from the lower layer entity.

2. The method of claim 1, wherein the information indicating that the data block cannot be constructed and the another size information on the data block that can be constructed at the protocol layer are included in a header of the data block.

* * * * *